(12) United States Patent
Fleischer et al.

(10) Patent No.: US 11,990,866 B2
(45) Date of Patent: May 21, 2024

(54) PV-DEVICE HAVING REDUCED AGING

(71) Applicant: Siemens Energy Global GmbH & Co. KG, Bayern (DE)

(72) Inventors: Maximilian Fleischer, Hohenkirchen (DE); Roland Pohle, Herdweg (DE); Elfriede Simon, Munich (DE); Oliver von Sicard, Munich (DE)

(73) Assignee: Siemens Energy Global GmbH & Co. KG, Bayern (DE)

(*) Notice: Subject to any disclaimer, the term of this patent is extended or adjusted under 35 U.S.C. 154(b) by 483 days.

(21) Appl. No.: 17/276,567

(22) PCT Filed: Sep. 12, 2019

(86) PCT No.: PCT/EP2019/074317
§ 371 (c)(1),
(2) Date: Mar. 16, 2021

(87) PCT Pub. No.: WO2020/064344
PCT Pub. Date: Apr. 2, 2020

(65) Prior Publication Data
US 2022/0052639 A1    Feb. 17, 2022

(30) Foreign Application Priority Data
Sep. 27, 2018    (DE) .................... 10 2018 216 607.2

(51) Int. Cl.
*H02S 50/10*    (2014.01)
*G01K 7/16*    (2006.01)

(52) U.S. Cl.
CPC ................ *H02S 50/10* (2014.12); *G01K 7/16* (2013.01); *G01K 2217/00* (2013.01)

(58) Field of Classification Search
CPC ....... H01L 31/00–078; Y02E 10/50–60; H02S 40/42; H02S 50/00–10
(Continued)

(56) References Cited

U.S. PATENT DOCUMENTS

| 4,620,140 A | 10/1986 | Chonan |
| 2011/0036344 A1* | 2/2011 | Jain .................... H01L 31/02021 126/714 |

(Continued)

FOREIGN PATENT DOCUMENTS

| CN | 103080712 A | 5/2013 |
| CN | 103427133 A | 12/2013 |

(Continued)

OTHER PUBLICATIONS

JP2018133955 English translation (Year: 2018).*
(Continued)

*Primary Examiner* — Bach T Dinh
(74) *Attorney, Agent, or Firm* — Wolter Van Dyke Davis, PLLC

(57) ABSTRACT

A photovoltaic device having a perovskite PV cell having reduced aging. The internal temperature of the perovskite PV cell, or a measure thereof, is determined using a measurement of an electrical parameter. In the case that it is detected that the corresponding measured value exceeds a threshold value, i.e., that the internal temperature is too high, the operating conditions of the perovskite PV cell are adjusted to the effect that the internal temperature reduces again. This can be achieved, for example, by an input resistance of power electronics of the perovskite PV cell being adjusted such that lower ohmic losses occur, as a result of the correspondingly altered electric currents.

13 Claims, 1 Drawing Sheet

(58) Field of Classification Search
USPC .................................................. 136/243–265
See application file for complete search history.

(56) References Cited

U.S. PATENT DOCUMENTS

| | | | | |
|---|---|---|---|---|
| 2013/0156072 | A1* | 6/2013 | Hebiguchi | ........... G01R 31/382 374/183 |
| 2013/0307487 | A1 | 11/2013 | Matthe | |
| 2014/0111220 | A1 | 4/2014 | Andersen | |
| 2014/0269811 | A1 | 9/2014 | Maleki | |
| 2017/0149380 | A1 | 5/2017 | Tsai | |
| 2017/0373201 | A1 | 12/2017 | Macerini | |
| 2018/0248061 | A1* | 8/2018 | Bullen | ................. H01L 31/032 |
| 2020/0144238 | A1 | 5/2020 | Fleischer | |

FOREIGN PATENT DOCUMENTS

| | | | |
|---|---|---|---|
| CN | 103733510 | A | 4/2014 |
| CN | 107546712 | A | 1/2018 |
| DE | 3516876 | C2 | 4/1991 |
| DE | 102009044057 | * | 3/2011 |
| DE | 102011087761 | A1 | 6/2013 |
| DE | 102017205524 | A1 | 9/2018 |
| JP | 2018133955 | A * | 8/2018 |
| WO | 2011032993 | A1 | 3/2011 |
| WO | 2016005092 | A1 | 1/2016 |
| WO | 2016005101 | A1 | 1/2016 |

OTHER PUBLICATIONS

DE102009044057 English translation (Year: 2011).*
Proskuryakov Y et al: "Impedance spectroscopy of unetched CdTe/CdS solar cells-equivalent circuit analysis", Journal of Applied Physics, American Institute of Physics, US, vol. 102, No. 2, pp. 24504-24504, XP012101315, ISSN: 0021-8979, DOI: 10.1063/1.2757011; Abstract; D. Assessment of p-n junction parameters; p. 6, V. Discussion; p. 9, VI. Conclusions; p. 11; 2007.
PCT International Search Report and Written Opinion of International Searching Authority dated Dec. 19, 2019 corresponding to PCT International Application No. PCT/EP2019/074317 filed Sep. 12, 2019.
Bag, Monojit et al: "Kinetics of Ion Transport in Perovskite Active Layers and it Implications for Active Layer Stability"; Oct. 2015, XP055852356; Retrieved from Internet: URL: https://www.researchgate.net/profile/M-Bag/publication/282572233_Sl-jacs_081115-MB/links/56125c9e08ae4833751c0937/Sl-jacs081115-MB.pdf; [retrieved on Oct. 18, 2021].

* cited by examiner

PV-DEVICE HAVING REDUCED AGING

CROSS REFERENCE TO RELATED APPLICATIONS

This application is the US National Stage of International Application No. PCT/EP2019/074317 filed 12 Sep. 2019, and claims the benefit thereof. The International Application claims the benefit of German Application No. DE 10 2018 216 607.2 filed 27 Sep. 2018. All of the applications are incorporated by reference herein in their entirety.

FIELD OF INVENTION

The invention relates to a photovoltaic device with a perovskite PV cell and, in particular, to the aging of such a perovskite PV cell.

BACKGROUND OF INVENTION

Solar electricity generation by means of photovoltaic (PV) technology is responsible for a sharply rising share of electricity production, for example in central Europe, for environmental-political reasons and, increasingly, also for commercial reasons. A large number of PV installations have already been installed globally, primarily constructed using conventional approaches with silicon-based PV cells, in which the light-sensitive component of the PV cell that provides an electrical voltage U1 when irradiated with light L, in other words that converts the light L impinging on the PV cell into an electrical output voltage U1, consists primarily of silicon. For some years, however, what are known as perovskite materials such as, for example, $CH_3NH_3PbI_3$ (or, more generally, $(CH_3NH_3)MX_{3-x}Y_x$ (where M=Pb or Sn and where X, Y=I, Br or Cl)), which, due to their optoelectronic properties, enable a highly efficient conversion of electromagnetic radiation energy into electrical energy, have been investigated with regard to their use in PV cells. Perovskite-based PV cells, i.e. PV cells whose light-sensitive components consist primarily of a perovskite material, are characterized on the one hand in that they are comparatively economical. On the other hand, the perovskite PV cells represent a serious alternative to the conventional, silicon-based PV cells, since, as a result of the advances achieved in recent years in respect of their efficiency, influenced by what is known as the "photo conversion efficiency" (PCE), from a few percent to over 20% nowadays, it is suggested that efficiencies can be achieved that significantly exceed those of conventional PV cells. The operation of a perovskite PV cell either alone or in a tandem PV module, for example in combination with a conventional, silicon PV cell, is thus conceivable. The latter is, for example, described in PCT/EP2018/055499.

In spite of the highly promising development, the perovskite PV cells are, however, subject to the problem that their efficiency is not constant. It has in particular been established in this context that, as a result of its typically poor thermal stability, the efficiency of a perovskite PV cell reacts sensitively to high temperatures; in other words, the efficiency of a perovskite PV cell falls as the temperature rises. The poor thermal stability, however, has not only a short-term effect on the perovskite PV cell. The temperature stresses additionally cause an accelerated aging of the perovskite PV cell, which can, for example, have the effect that decomposition of the perovskite material underlying the light-sensitive component can follow, along with ion migration and/or the formation of defects in the light-sensitive component. Each of these effects influences the optoelectronic properties of the material of the light-sensitive component in a negative manner, with the result that the parameters characterizing the PV cell, such as, for example, the no-load voltage, the short-circuit current and, finally, the efficiency, for which, for example, what is known as the "photon conversion efficiency" (PCE) is a gauge, deteriorate in the medium- to long-term.

SUMMARY OF INVENTION

It is therefore an object of the present invention to reduce the medium- and long-term aging of the perovskite PV cell.

This object is achieved through the PV device and through the operating method as described. The subsidiary claims describe advantageous embodiments.

The PV device comprises a perovskite PV cell for converting light L impinging on the perovskite PV cell into an electrical output voltage U1 that can be accessed at electrical terminals of the perovskite PV cell, along with an arrangement for monitoring the instantaneous internal temperature T(t1) of the perovskite PV cell and for initiating a corresponding measure to reduce the internal temperature if this exceeds the temperature threshold value TS. Against this background, the arrangement is designed to ascertain a gauge for the internal temperature T of the perovskite PV cell, and for that purpose, at least in a measuring state of the PV device, to measure an electrical parameter PARAM of the perovskite PV cell and to ascertain the gauge for the instantaneous internal temperature T(t1) of the perovskite PV cell from the measured parameter PARAM(t1).

In a method for operating such a PV device with the ultimate goal of slowing an aging of the perovskite PV cell of the PV device, the electrical parameter of the perovskite PV cell is thus measured in the measuring state of the PV device and the gauge for the instantaneous internal temperature of the perovskite PV cell is ascertained from the measured parameter.

The formulation used here and below that a "gauge" is to be ascertained for the internal temperature of course includes the special feature that not only the gauge for the temperature but in fact the temperature itself is ascertained. For the application intended here, it is in fact not entirely essential that an absolute temperature is present, since, as will yet be described below, it is the comparison with a threshold value TS that is relevant. If it is assumed that this threshold value TS is also appropriately dimensioned or scaled, it is sufficient simply to be able to make use of a gauge for the internal temperature.

In order also to be able to ensure a highly efficient operation of the perovskite PV cell in the medium-term and long-term, the parameters mentioned that influence the aging must be monitored and, as far as possible, avoided. Attention must in particular be paid here to the internal temperature of the perovskite PV cell, i.e. the temperature in the interior of the perovskite PV cell, for example that of the light-sensitive component. The internal temperature has a considerable influence on the performance and on the long-term stability of perovskite-based PV cells. It has not, however, been possible until now to measure the internal temperature directly with conventionally available means, since no PV cells with integrated temperature sensors are available.

The concept has therefore been followed of using the effect of the temperature on specific electrical parameters of the perovskite PV cell in order to be able to deduce the temperature. The specific electrical parameters and their change are taken as a gauge for the instantaneous internal temperature of the perovskite PV cell. The approach underlying the concept is that of being able to monitor and correspondingly control or regulate the PV cell with the aim of reducing the degradation of the perovskite PV cell without having to physically modify the PV cell itself.

The arrangement is designed to compare the ascertained gauge for the instantaneous internal temperature T of the perovskite PV cell with a threshold value TS, and, for the specific case in which the ascertained gauge for the instantaneous internal temperature T exceeds the threshold value TS, to adjust operating conditions of the perovskite PV cell in such a way that the internal temperature falls. In this way, the possibility that, as a result of excessive internal temperatures of the perovskite PV cell, damage and/or premature or accelerated aging of the perovskite PV cell occurs is prevented.

For example, the measured variable PARAM, which, without appropriate conversion, does not yet represent a temperature but is merely a gauge for the temperature, can be compared with a threshold value TS to which the same consideration applies, which in other words does not truly represent a temperature, but is merely a gauge for it.

The arrangement is furthermore designed to operate a power electronics unit of the PV device which, at least in a normal operating state of the PV device, converts the electrical output voltage U1 provided by the perovskite PV cell when impinged upon by light L into an output voltage U2 that can be accessed at an output A of the power electronics unit, in such a way that in the case concerned here, through adjusting an input resistance of the power electronics unit of the PV device, an electrical current I1 resulting in the presence of an output voltage U1 of the perovskite PV cell is reduced.

The operating method accordingly provides that the ascertained gauge for the instantaneous internal temperature T of the perovskite PV cell is compared with a threshold value TS, and that, for the specific case in which the ascertained gauge for the instantaneous internal temperature T exceeds the threshold value TS, operating conditions of the perovskite PV cell are adjusted in such a way that the internal temperature falls. In the case concerned here, through adjusting the input resistance of a power electronics unit of the PV device, a current I1 resulting in the presence of an output voltage U1 of the perovskite PV cell is reduced.

As a result of the reduced current, ohmic losses are lower and heat development is thus smaller. The medium-term and long-term effect is that the perovskite PV cell ages more slowly.

The arrangement for ascertaining the gauge for the instantaneous internal temperature T of the perovskite PV cell comprises an electrical energy source and a control unit of the PV device that is in principle provided for operation of the PV device and which in this context can also operate the energy source. The control unit is designed to operate the energy source in the measuring state in such a way that to measure the electrical parameter PARAM a predeterminable electrical voltage, powered by the electrical energy source, is present at the perovskite PV cell and in particular at its light-sensitive component across the electrical terminals of the perovskite PV cell, to measure a response I1 of the perovskite PV cell to the applied voltage and to determine the electrical parameter PARAM from the response I1 in combination with the applied voltage, so that it is possible to deduce the gauge for the internal temperature.

The electrical energy source is here ideally an energy source, for example a battery or a capacitor, already provided in any case in the power electronics unit.

In this case, the arrangement for ascertaining the gauge for the instantaneous internal temperature of the perovskite PV cell comprises the previously mentioned power electronics unit of the PV device, as well as the control unit of the PV device that is also designed to operate the power electronics unit. The control unit is designed in particular to operate the power electronics unit in the measuring state in such a way that to measure the electrical parameter the power electronics unit, powered by the electrical energy source that is integrated into the power electronics unit, applies a predeterminable electrical voltage to the perovskite PV cell and in particular to its light-sensitive component across the electrical terminals of the perovskite PV cell, a response I1 of the perovskite PV cell to the applied voltage is measurable, and the electrical parameter PARAM can be determined from the response I1 in combination with the applied voltage, and it is thus possible to deduce the gauge for the internal temperature.

The operating method thus provides that to measure the electrical parameter PARAM a predeterminable electrical voltage is applied to the perovskite PV cell, and in particular to its light-sensitive component, a response I1 of the perovskite PV cell to the applied voltage is measured, and the electrical parameter PARAM is determined from the response I1 in combination with the applied voltage, and it is thus possible to deduce the gauge for the internal temperature. The electrical energy source is here ideally an energy source, for example a battery or a capacitor, already provided in any case in the power electronics unit, which means that the power electronics unit is the component carrying out the above-mentioned steps.

The monitoring of the internal temperature can thus be carried out with the aid of the components of the PV device that are in any case present.

The electrical parameter can, for example, be an impedance of the perovskite PV cell or can be a cyclovoltammogram that can be ascertained with the aid of the method of cyclovoltammetry, in the latter case in particular a peak of the measured cyclovoltammogram.

The gauge being sought for the instantaneous internal temperature, and now here in particular the instantaneous internal temperature itself, can be determined on the basis of a model from the measured electrical parameter, i.e. from the impedance and/or from the cyclovoltammogram. The underlying model that describes the relationship between the measured parameter and the associated internal temperature is ideally specific for the individual perovskite PV cell, i.e. it may be the case in some circumstances that different models apply to different perovskite PV cells. It can, however, be assumed here that the models for comparable perovskite PV cells are quite similar to one another. Accordingly, for the sake of practicability, one and the same model could be used for perovskite PV cells from the same manufacturing series or with the same technical data.

It can alternatively also be provided that the gauge for the instantaneous internal temperature is determined from the measured electrical parameter with reference to a lookup table associated with the perovskite PV cell.

By monitoring the instantaneous internal temperature, or a gauge for the internal temperature of the perovskite PV cell, it is possible, through the initiation of corresponding measures if relevant, to prevent overheating of the perovskite PV cell and thereby an accelerated aging. The monitoring of the temperature and/or the performance of the measures can advantageously be carried out by the power electronics unit that is in any case present in combination with the control unit of the PV device, so that no additional components have to be installed.

Further advantages and forms of embodiment emerge from the drawings and the corresponding description.

It is to be noted in respect of the expressions "for operation of the PV device" or "that the control unit is designed to operate the PV device in such a way that", etc., i.e. expressions in which the control unit is to "operate" the PV device or one of its components, that the respective operation, depending on the situation and the need, is a regulation or control of the respectively operated component. It is assumed that it will be clear to an expert, depending on the situation and the need, whether the control unit controls or regulates in the respective situation.

The invention and exemplary forms of embodiment are explained in more detail below with reference to drawings. The same components are identified there in different figures by the same reference signs. It is therefore possible that, in the description of a second figure, no closer explanations are present for a certain reference sign that has already been explained in connection with another, first figure. In such a case it can be assumed in the context of the form of embodiment of the second figure that the component identified there with this reference sign also, without further explanation in connection with the second figure, has the same properties and functionalities as have been explained in connection with the first figure. Furthermore, for the sake of clarity, in some cases not all of the reference signs are shown in all of the figures, but only those to which reference is made in the description of the respective figure.

BRIEF DESCRIPTION OF THE DRAWINGS

Here.

DETAILED DESCRIPTION OF INVENTION

For the sake of clear terminology, it should be noted in advance that terms such as "above", "below", "over", "on", "under" and so forth refer in the respective connection to a coordinate system in which the source of the light that is to be converted into electrical voltage by the PV cell, i.e. for example the sun, is located "above" or "over" the PV cell.

Figure 1:
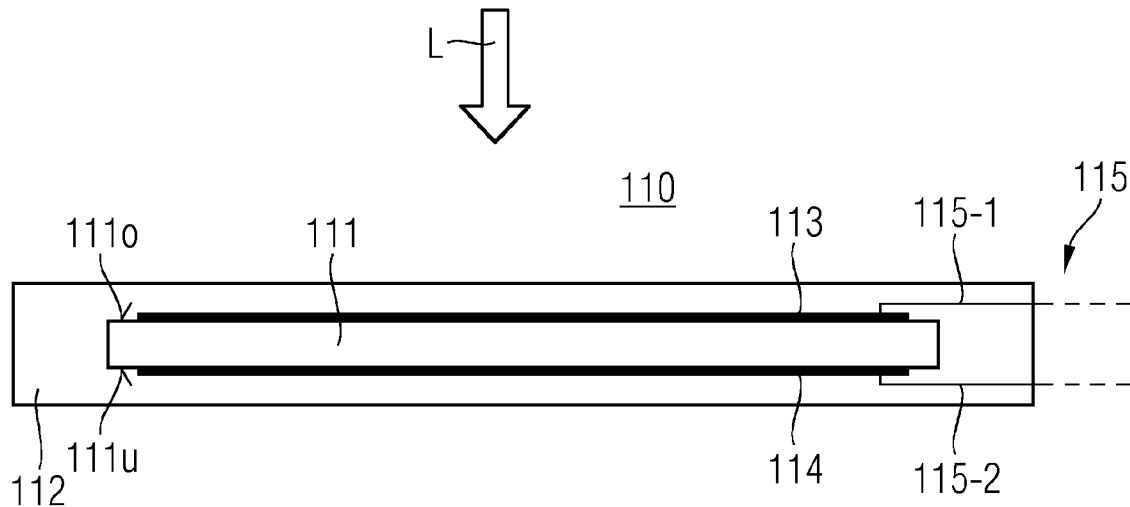
FIG. 1 shows a perovskite PV cell.

FIG. 1 shows a PV cell 110 in an exemplary and simplified manner. The PV cell 110 comprises a light-sensitive component 111 that is embedded in a carrier 112, for example glass. The light-sensitive component 111 that, when irradiated with light L, provides an electrical voltage U1, that in other words converts the light L impinging on the PV cell 110 into an electrical output voltage U1, consists primarily of a perovskite material as has been described above, for which reason the PV cell 110 is also referred to below as the "perovskite PV cell". In practice, the light-sensitive component 111 consists of a plurality of layers, but in the context discussed here this does not play an important role, and is accordingly not explained in more detail. The general mode of operation of a PV cell 110 and, in particular, that of a light-sensitive component 111 is, furthermore, sufficiently well-known, and is therefore also not explained in more detail below. It is simply mentioned that the electrical output voltage U1 that is generated in the light-sensitive component 111 as a result of the irradiation with light L can be accessed at electrodes 113, 114 of the PV cell. In practice, the electrodes 113, 114 typically extend over the entire upper or lower surface 111$o$, 111$u$ of the light-sensitive component 111. The electrode 113 at the surface 111$o$ that faces the light L or the corresponding light source, not explicitly illustrated, of the light-sensitive component 111 is at least transparent for that portion of the spectrum of the light L for which the light-sensitive component 111 has its maximum efficiency. This material, which is thus semitransparent, can, for example, be Spiro-OMeTAD doped with Li-TFSI. The electrode 114 at the lower surface 111$u$ of the light-sensitive component 111 does not, on the other hand, have to be transparent and can, for example, consist of gold. The perovskite PV cell 110 furthermore comprises an electrical connection 115 with cables 115-1, 115-2 with which, as suggested in FIG. 2, it can be connected to a power electronics unit 120 in order to provide the voltage U1 generated when illuminated to the power electronics unit 120. The power electronics unit 120 is typically implemented as an inverter that converts the DC voltage U1 provided by the perovskite PV cell 110 into an alternating voltage U2 suitable for a consumer 2 provided at an output 124 of the power electronics unit.

Figure 2:
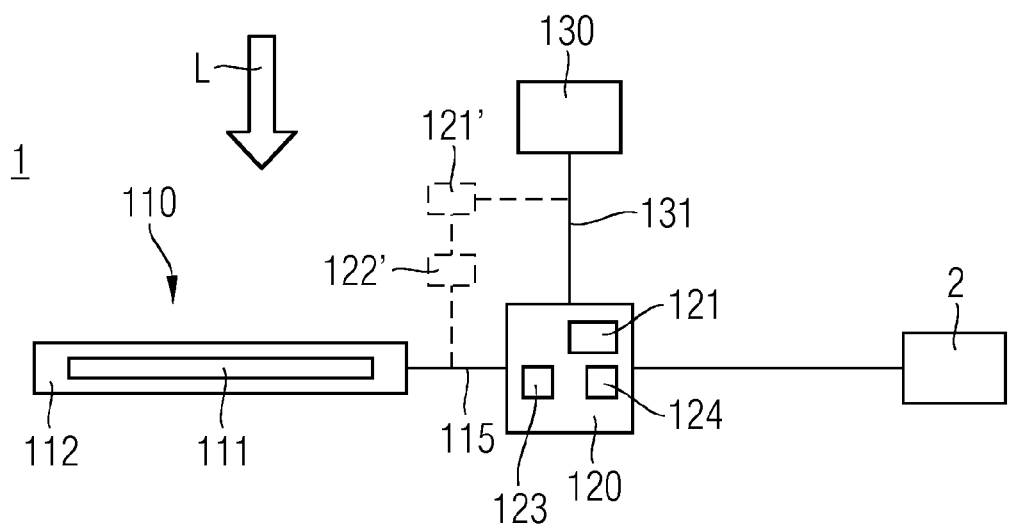
FIG. 2 shows a PV device.

FIG. 2 shows by way of example and in a simplified form a PV device 1 with a perovskite PV cell 110 as explained in connection with FIG. 1, and with the power electronics unit 120 mentioned above. The PV device 1 further comprises a control unit 130 that is designed to operate the PV device 1 in accordance with the operating mode that is desired or needed. For example, a normal operating mode in which the perovskite PV cell 110 provides the output voltage U1 on the basis of the illumination with light L, and a measuring state in which, as described below, the instantaneous internal temperature T of the perovskite PV cell 110 is measured, can here be provided as operating modes. The power electronics unit 120, which on the one hand is connected via a data link 131 to the control unit 130, is in fact regulated or if appropriate controlled in particular to monitor the operation of the perovskite PV cell 110 as part of the PV device 1. On the other hand, the power electronics unit 120 is assigned to the PV cell 110, and the electrical voltage U1 that is generated by the perovskite PV cell 110 when illuminated with light L is supplied to the power electronics unit 120 by way of the electrical cable 115.

In normal operation of the PV device 1 the perovskite PV cell 110 and, in particular, its light-sensitive component 111 is illuminated with light L, and generates the output voltage U1. This is supplied to the power electronics unit 120, and there, in accordance with the need and operated by the control unit 130, is converted into an electrical voltage U2 which finally is provided to the electrical consumer 2.

In normal operation of the PV device 1 it is possible, as mentioned in the introduction, that significantly increased internal temperatures T arise in the perovskite PV cell 110, which has a negative effect on the aging of the perovskite PV cell 110. To anticipate such a development, the PV device 1 comprises an arrangement 200 for monitoring the instantaneous internal temperature T(t1), i.e. the temperature at a specific time point t1, of the perovskite PV cell 110. The arrangement 200 is in particular designed to measure an instantaneous electrical parameter PARAM(t1) of the perovskite PV cell 110 when in the measuring state discussed above, and to deduce the internal temperature T(t1) of the perovskite PV cell 110 from the measured parameter PARAM(t1). In a first advantageous embodiment the arrangement 200 is realized by the control unit 130 working together with the power electronics unit 120 and, in particular, with an energy source 121 integrated into the power electronics unit 120, but in an alternative embodiment can however also be realized with the aid of a separate energy source 121'.

In a first approach, the electrical parameter PARAM from which the arrangement 200 deduces the internal temperature T of the perovskite PV cell 110 can be the instantaneous impedance IMP(t1) of the perovskite PV cell 110 and, in particular, that of the light-sensitive component 111, i.e. PARAM(t1)=IMP(t1). To measure the instantaneous impedance IMP(t1), an alternating electrical voltage U_imp is applied to the light-sensitive component 111 by the power electronics unit 120, operated by the control unit 130 by way of the electrical cable 115 and the electrodes 113, 114 and powered by an energy source 121 in a manner known per se, and the resulting current is measured, from which the instantaneous impedance IMP(t1) can finally be ascertained. The energy source 121 that supplies the electrical energy for the voltage U_imp that is to be supplied can, for example, be designed as a battery or capacitor, and integrated into the power electronics unit 120. Since the principle of an impedance measurement can be assumed to be known per se, it is not explained further at this point. It is only mentioned that the frequency of the alternating voltage U_imp can, if appropriate, be varied in the context of the measurement in order to finally achieve a more accurate result, since a large number of impedances IMP for different frequencies f are determined, so that the determination of the temperature T takes place with reference to a large number of independent measured values IMP(f). The instantaneous impedance IMP(t1) of the perovskite PV cell 110 ascertained in this way finally serves as a gauge for the instantaneous temperature of the perovskite PV cell 110.

The instantaneous electrical parameter PARAM(t1) from which the arrangement 200 concludes the instantaneous internal temperature T(t1) of the perovskite PV cell 110 can in a second approach, instead of the impedance, be an instantaneous cyclovoltammogram CYCL(t1) ascertainable with the aid of the method of cyclovoltammetry, i.e. PARAM(t1)=CYCL(t1), wherein the ascertained or measured cyclovoltammogram CYCL(t1) represents a gauge for the instantaneous internal temperature T(t1) that is to be ascertained. Reference is made here, purely by way of example, to "Cyclovoltammetrische Bestimmung redoxaktiver Gase mittels eines Festelektrolytsensors" ("Cyclovoltammetric determination of redox-active gases using a solid electrolyte sensor") by M. Schelter et al., published in the proceedings of the 12th Dresdner Sensor-Symposium 2015, pages 239-244, wherein a dependency on the respective temperature of a measurement cell of cyclovoltammograms measured by means of cyclovoltammetry is shown. The temperature present in each case can accordingly be concluded from a measured cyclovoltammogram. In cyclovoltammetry, as is known, for example, a curve of voltage against time which has an essentially sawtooth form is applied to a pair of electrodes. Operated by the control unit 130 by way of the electrical cable 115 and the electrodes 113, 114, and powered by the energy source 121, the power electronics unit 120 thus applies a sawtooth voltage U_cycl to the light-sensitive component 111, and measures the current I_cycl resulting over a corresponding period of time, from which, finally, what is known as a cyclovoltammogram CYCL(t1) can be ascertained, in which the measured current I_cycl is plotted against the applied voltage U_cycl and which can, for example, be assigned to the time point t1 at which the measurement was started. The cyclovoltammogram CYCL is characterized in that, like also the impedance IMP, it is temperature-dependent, so that the temperature T can be deduced from the cyclovoltammogram CYCL. A cyclovoltammogram can finally be described by a variety of variables; it has, for example, a characteristic peak I_cycl_max. The electrical parameter PARAM(t1) that is to be measured can, for example, be realized by this peak, which is to say in particular by its height, i.e. PARAM(t1)=I_cycl_max.

Both in the first approach for ascertaining PARAM(t1) based on an impedance measurement and in the second approach in which the electrical parameter PARAM(t1) is ascertained by means of a cyclovoltammetry measurement, the arrangement 200 can be configured in such a way that the instantaneous temperature T(t1) is determined on the basis of a model from the measured, instantaneous electrical parameter PARAM(t1)=IMP(t1) or PARAM(t1)=CYCL(t1). The appropriate underlying model M that describes the relationship between the measured parameter PARAM(t1) and the associated internal temperature T(t1) is ideally specific for the individual perovskite PV cell 110, i.e. it may be the case in some circumstances that different models M apply to different perovskite PV cells. It can, however, be assumed here that the models M for comparable perovskite PV cells are quite similar to one another. Accordingly, for the sake of practicability, one and the same model M could be used for perovskite PV cells from the same manufacturing series or with the same technical data. The model M is accordingly a function that assigns an internal temperature T(t1) of the perovskite PV cell 11 to a measured parameter PARAM(t1), i.e. T(t1)=M(PARAM(t1)). In order to ensure that the measurement is unambiguous, such a model M should exhibit a strictly monotonic relationship between the observed variables T and PARAM at least in the relevant measuring range.

As an alternative to the model-based determination of the instantaneous internal temperature T(t1) of the perovskite PV cell 110, the arrangement 200 can work or be configured in such a way that the instantaneous temperature T(t1) is determined from the measured electrical parameter PARAM(t1) on the basis of a lookup table assigned to the perovskite PV cell 110. To ascertain such a lookup table for the perovskite PV cell 110, the PV cell 110 can, for example, in particular in advance of the installation of the perovskite PV cell 110, be exposed, for periods of time chosen to be sufficiently long, to fixed environmental conditions, so that it can be assumed with adequate certainty that the internal temperature T corresponds to the known temperature of the environment of the perovskite PV cell 110. An impedance measured value IMP(t0) resulting from a measurement of the impedance IMP carried out at the corresponding time point t0, or a correspondingly ascertained cyclovoltammogram CYCL(t0), can then be assigned to the corresponding temperature T(t0). This is performed for a plurality of temperatures and a lookup table is, for example, filled with the respective corresponding resultant impedance measured values or cyclovoltammograms, which can then be used during normal operation of the perovskite PV cell 110 in order to deduce the instantaneous internal temperature T(t1) from a measured impedance value IMP(t1) or from a measured cyclovoltammogram CYCL(t1).

It follows from this that, in both approaches to the measurement of the instantaneous electrical parameter PARAM(t1), an instantaneous internal temperature T(t1) can be derived from said parameter PARAM(t1) in the arrangement 200, and in particular by its control unit 130. The control unit 130 is configured inter alia to monitor the internal temperature T on the basis of these measurements and, if relevant, to initiate measures with the aim of a reduced aging of the perovskite PV cell 110. The monitoring can, for example, take place in that the described ascertainment of the internal temperature T(ti) is carried out at a plurality of times ti with i=1, 2, 3, . . . . The control unit 130 compares the respective ascertained instantaneous internal temperature T(ti) with a temperature threshold value TS. The temperature threshold value TS is selected in such a way that, for as long as the instantaneous internal temperature T(ti) lies below this threshold value TS, the perovskite PV cell 110 will not undergo any medium-term or long-term damage, in other words that the aging of the perovskite PV cell 110 does not advance significantly, at least not as a result of the internal temperature T. This threshold value TS is accordingly related to the material-dependent temperature at which for example a decomposition or the like of the material of the light-sensitive component 111 begins. This temperature, or the threshold value TS, can typically lie in the general region of about TS=120° C. As suggested, this does, however, vary with the material on which the light-sensitive component 111 is based.

In the event that the instantaneous internal temperature T exceeds the temperature threshold value TS, the arrangement 200, and, in particular, the control unit 130, ensures that the operating conditions of the perovskite PV cell 110 are adjusted in such a way that the internal temperature falls back at least until T<TS. In this way, the possibility that, as a result of excessive internal temperatures of the perovskite PV cell 110, damage and/or premature or accelerated aging of the perovskite PV cell 110 occurs is prevented.

The operating conditions to be adjusted can, for example, include the operating voltage or the operating current of the perovskite PV cell 110 which are adjusted by the control unit 130, working together with the power electronics unit 120, in such a way that the desired temperature reduction is achieved through a lower heat development in the perovskite PV cell 110. The operating conditions are adjusted here in such a way that, for example, ohmic losses are reduced, so that the lower heat development results. Concretely it can be ensured that, for example through an appropriate adjustment of an input resistance 123 of the power electronics unit 120, a current magnitude I1 resulting in the presence of an output voltage U1 of the perovskite PV cell 110 is changed, and in particular reduced. This also leads to a change in the working point of the perovskite PV cell 110 on its characteristic current-voltage curve which may no longer correspond to the optimum working point ("maximum power point", or MPP), but at which the internal temperature T of the perovskite PV cell 110 falls as a result of the preferably reduced current I1. As a result of the reduced current, ohmic losses are lower and heat development is thus smaller. The medium-term and long-term effect is that the perovskite PV cell 110 ages more slowly.

In the first embodiment mentioned above, the arrangement 200 for monitoring the instantaneous internal temperature T(t1) of the perovskite PV cell 110 and for initiating a corresponding measure to lower the internal temperature if this exceeds the temperature threshold value TS is realized through the control unit 130 working together with the power electronics unit 120 of the PV device 1 and the energy source 121 integrated therein. The expression "integrated" is to be understood here to mean that the energy source 121 that provides the electrical voltage necessary in both approaches is not merely for example housed in a housing of the power electronics unit 120. "Integrated" means rather that the energy source 121 which, in this case, is in particular constructed as a battery or as a capacitor is integrated in terms of circuitry into the circuit of the power electronics unit 120. The energy source 121 can particularly advantageously be a component that is in any case provided in the circuit of the power electronics unit 120. This also opens up the possibility that the energy source 121 can be charged up from the output voltage U1 provided by the perovskite PV cell 110 when irradiated with light L in normal operation of the PV device 1, i.e. in particular when the internal temperature T lies below the temperature threshold value TS. Examples of such circuits with energy stores integrated into the power electronics unit are indicated in PCT/EP2015/061129 and PCT/EP2015/061932.

As an alternative to integration into the power electronics unit 120, the energy source 121 can also be a separate energy source 121' arranged outside and independently of the power electronics unit 120, for example a battery or a connection to a public or private electrical grid. This is demonstrated by the energy source 121' suggested by dashed lines in FIG. 2 which can, for example, be connected via the electrical connection 115 and the corresponding electrodes 113, 114 to the light-sensitive component 111. The energy source 121' could alternatively of course also be connected to the electrodes 113, 114 of the light-sensitive component 111 by way of a separate, additional connection. This is, however, less advantageous, in that in this case additional effort would be necessary in terms of the corresponding wiring and contacting. Depending on the type of the separate energy source 121', it is possible that electronics 122' will be necessary to convert an alternating electrical voltage provided, for example, by the electrical grid 121' into the voltage U_imp or U_cycl required for the determination of PARAM. Here, the electronics 122', which may be designed, as required, for example as a rectifier, converter or inverter, would be operated appropriately by the control unit 130.

The integration of the energy source 121 into the power electronics unit 120 however brings the significant advantage with it in contrast to the use of a separate energy source 121' that the data link 131 that is in any case present between the control unit 130 and the power electronics unit 120 can be used in order to operate the energy source 121 in the power electronics unit 120 directly in such a way that in the specific situations it supplies the necessary voltage U_imp or U_cycl. The use of an energy source already present in the electronic circuit of the power electronics unit 120 is particularly advantageous. Modern power electronics units 120 of this sort are frequently connected to or comprise what are known as "power optimizers" that are electrically coupled to the inverter 120 and comprise a component that can be employed as an energy source or that can themselves function as such. This component of the electronic circuit of the power electronics unit 120 can be used in the application described here as a source 121 of electrical energy to provide the initial voltage to the electrodes 113, 114, wherein the correspondingly required control or regulation is provided by the control unit 130. In the case described the power electronics unit 120 thus does not have to be changed, but use is rather made of the available electronic circuit.

Irrespective of the type of energy source 121, i.e. integrated into the power electronics unit 120 as in PCT/EP2015/061129 and PCT/EP2015/061932, or realized by a power optimizer, a gauge for the instantaneous internal temperature T(t1) of the perovskite PV cell 110 is ascertained in both approaches for determining the electrical parameter PARAM(t1). As soon as this gauge implies that the predefined temperature threshold value has been exceeded, the operating conditions of the perovskite PV cell 110 are adjusted in such a way that the internal temperature falls back at least until T<TS.

REFERENCE SIGNS

1 PV device
110 Perovskite PV cell
111 Light-sensitive component
111o Upper surface
111u Lower surface
112 Carrier
113 Electrode
114 Electrode
115 Electrical terminal, connection
115-1 Electrical cable
115-2 Electrical cable
120 Power electronics unit
121 Energy source, battery, capacitor, supercap
121' Energy source, electrical grid
122' Electronics
123 Input resistance
124 Output
130 Control unit
131 Data link

The invention claimed is:

1. A photovoltaic (PV) device comprising:
a perovskite PV cell for converting light impinging on the perovskite PV cell into an electrical output voltage U1, and
an arrangement for ascertaining a gauge for an internal temperature of the perovskite PV cell,
wherein the arrangement is designed, at least in a measuring state of the PV device, to measure an electrical parameter PARAM(t1) of the perovskite PV cell and to ascertain the gauge for the instantaneous internal temperature T(t1) of the perovskite PV cell from the measured parameter PARAM(t1),
wherein the electrical parameter PARAM is a cyclovoltammogram ascertainable with the aid of the method of cyclovoltammetry,
wherein the measured cyclovoltammogram CYCL(t1) represents the gauge for the instantaneous internal temperature T(t1) that is to be ascertained.

2. The PV device as claimed in claim 1,
wherein the arrangement is designed to compare the ascertained gauge for the instantaneous internal temperature of the perovskite PV cell with a threshold value, and,
for a specific case in which the ascertained gauge for the instantaneous internal temperature T(t1) exceeds the threshold value, to adjust operating conditions of the perovskite PV cell in such a way that the internal temperature of the perovskite PV cell falls.

3. The PV device as claimed in claim 2,
wherein the arrangement is designed to operate a power electronics unit of the PV device, which at least in a normal operating state of the PV device converts the electrical output voltage U1 provided by the perovskite PV cell when impinged upon by light into an output voltage U2 that can be accessed at an output of the power electronics unit, in such a way that in the specific case, through adjusting an input resistance of the power electronics unit of the PV device, an electrical current resulting in the presence of an output voltage U1 of the perovskite PV cell is reduced.

4. The PV device as claimed in claim 1,
wherein the arrangement for ascertaining the gauge for the instantaneous internal temperature of the perovskite PV cell comprises:
an electrical energy source, and
a control unit for operating the PV device, including the energy source,
wherein the control unit is designed
to operate the energy source in the measuring state in such a way that to measure the electrical parameter PARAM, the applied voltage, powered by the electrical energy source, is present at the perovskite PV cell and/or at its light-sensitive component, across an electrical terminal of the perovskite PV cell,
to measure a response of the perovskite PV cell to the applied voltage,
to determine the electrical parameter PARAM from the response in combination with the applied voltage.

5. The PV device as claimed in claim 1,
wherein the arrangement for ascertaining the gauge for the instantaneous internal temperature T(t1) of the perovskite PV cell comprises:
a power electronics unit of the PV device, and
a control unit of the PV device for operating the PV device, including the power electronics unit,
wherein the control unit is designed to operate the power electronics unit in the measuring state in such a way that
to measure the electrical parameter PARAM, the power electronics unit, powered by an electrical energy source integrated into the power electronics unit, provides the applied voltage to the perovskite PV cell, and/or to its light-sensitive component, across an electrical terminal of the perovskite PV cell,
a response of the perovskite PV cell to the applied voltage is measured,
the electrical parameter PARAM is determined from the response in combination with the applied voltage.

6. The PV device as claimed in claim 1,
wherein the arrangement is designed to determine the gauge for the instantaneous internal temperature T(t1) on the basis of a model from the measured electrical parameter PARAM(t1).

7. The PV device as claimed in claim 1,
wherein the electrical parameter PARAM is a peak of the cyclovoltammogram.

8. A method for operating a PV device as claimed in claim 1 for slowing an aging of the perovskite PV cell of the PV device, the method comprising:
selecting one of a plurality of voltage waveforms,
measuring the electrical parameter PARAM of the perovskite PV cell in the measuring state of the PV device based on an applied voltage associated with the selected voltage waveform, and
ascertaining the gauge for the instantaneous internal temperature T(t1) of the perovskite PV cell from the measured parameter PARAM(t1).

9. The method as claimed in claim 8, further comprising:
comparing the ascertained gauge for the instantaneous internal temperature T of the perovskite PV cell with a threshold value, and
for a specific case in which the ascertained gauge for the instantaneous internal temperature exceeds the threshold value, adjusting operating conditions of the perovskite PV cell in such a way that the internal temperature falls.

10. The method as claimed in claim 9,
wherein for the specific case, by adjusting an input resistance of a power electronics unit of the PV device, a current resulting in the presence of an output voltage U1 of the perovskite PV cell is reduced.

11. The method as claimed in claim 8,
wherein to measure the electrical parameter PARAM, the applied voltage is provided to the perovskite PV cell, and/or to its light-sensitive component, a response of the perovskite PV cell to the applied voltage is measured, and the electrical parameter PARAM is determined from the response in combination with the applied voltage.

12. The method as claimed in claim 11,
wherein a power electronics unit of the PV device is used in order to provide the applied voltage to the perovskite PV cell and/or to measure the response of the perovskite PV cell to the applied voltage.

13. A method for operating a PV device as claimed in claim 1 for slowing an aging of the perovskite PV cell of the PV device, the method comprising:
measuring the electrical parameter PARAM of the perovskite PV cell in the measuring state of the PV device, and
ascertaining the gauge for the instantaneous internal temperature $T(t1)$ of the perovskite PV cell from the measured parameter $PARAM(t1)$.

* * * * *